INVENTORS
KENNETH R. SHOULDERS
LOUIS N. HEYNICK
BY Samuel Lindenberg

ATTORNEY

United States Patent Office 3,453,478
Patented July 1, 1969

3,453,478
NEEDLE-TYPE ELECTRON SOURCE
Kenneth R. Shoulders, Woodside, and Louis N. Heynick, Palo Alto, Calif., assignors to Stanford Research Institute, Menlo Park, Calif., a corporation of California
Filed May 31, 1966, Ser. No. 553,832
Int. Cl. H01j 1/02, 17/04, 61/06
U.S. Cl. 313—309         4 Claims

ABSTRACT OF THE DISCLOSURE

A multiple needle electron emitting source is provided comprising a conductive layer having spaced thereover a plurality of sharp raised points, and successively placed thereover, with holes therethrough to permit exposure of these needle points, an insulating surface and a conductive surface on top thereof, said conductive surface comprising an accelerator electrode.

---

Figure 1:
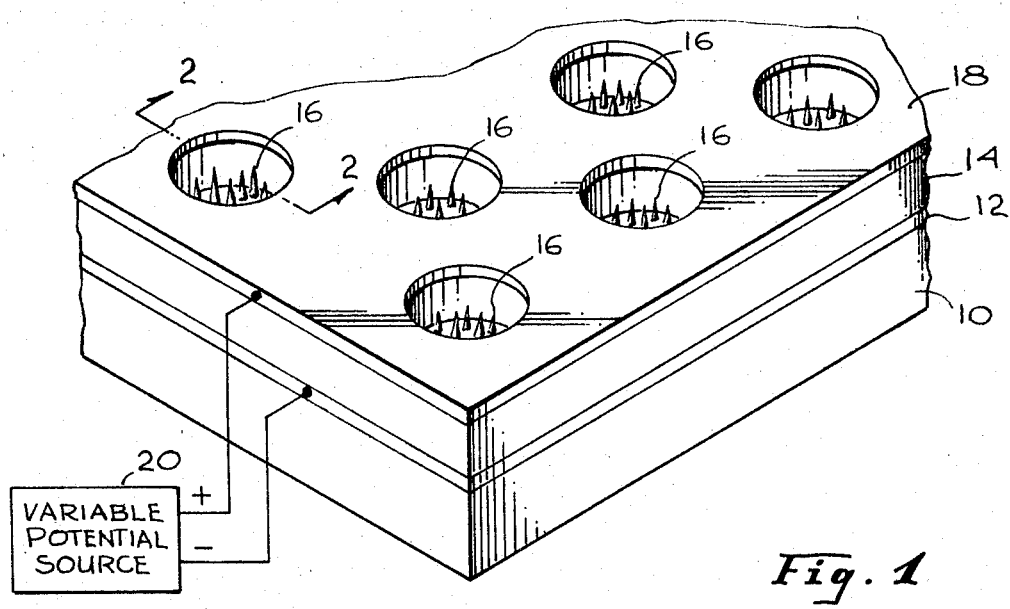

This invention relates to cold electron emitting structures and more particularly to improvements therein.

It is well known that electric fields on the order of several megavolts per centimeter can be used to produce electron emission from metals. In order to reduce the voltage required for producing such electron emission to a level more reasonable, such as on the order of kilovolts, sharp needles or points are used as emitters, a positive electrode is spaced from the emitter and a voltage is applied therebetween. Despite the high emission current-density capability of such field emission (on the order of a million amperes per centimeter squared), the total emission current from a needle emitter is low, because of the smallness of its emitting area. Furthermore, the electrons are emitted over a large solid angle, and they obtain almost the total energy of the applied voltage within a short distance from the emitter surface. Therefore, the formation of narrow electron beams that are suitable, for example, for use in high power beam type of electron tubes, requires elaborate and expensive focusing apparatus.

The operation of many needle emitters in parallel to increase the total current is feasible, but the problem of forming narrow beams of electrons from a plurality of needle emitters is extremely difficult. Also, each needle, of a multiple needle cathode experiences partial electrostatic shielding by its neighbors, from the common, relatively distant positive electrode producing the field, to an extent dependent on the separation between the needles. Therefor, the field required to produce a given emission current from each needle is higher than that needed for an isolated needle of the same sharpness. Conversely, for a given applied voltage, this effect limits the possible packing density of multiple needle cathodes.

An object of this invention is the provision of a multiple needle cathode which permits the forming of narrow electron beams.

Another object of the present invention is the provision of a high packing density multiple needle cathode.

Still another object of the present invention is the provision of a novel, useful, multiple needle cathode assembly operable at relatively low voltages.

Yet another object of the present invention is the provision of a field emission cathode structure in which the positive electrode can be used to control the emission, in the manner of a grid.

These and other objects of the invention are achieved by providing a construction for a multiple needle cathode which effectively comprises two closely spaced surfaces. On the first or emitter surface, a large number of sharp field emitting sites are distributed with a packing density limited only by the fabrication technology used. This surface can be planar or curved and of a size to suit the intended application. The second surface, also called the accelerator surface, is the electrode used to produce the field. It consists of a very thin foil or film of metal of the same contour as the surface with the emitter site, and is suitably supported and electrically insulated therefrom at spacings ranging from a fraction of a micron to several microns. The accelerator has holes therethrough the number and distribution of which correspond substantially to the number and distribution of the emitting sites. Because of the minimal separation range between the emitter surface and the accelerator surface, the voltage needed to produce field emission ranges from only a few volts to about one hundred volts, and the emitted electrons emerge from the holes in the accelerator with correspondingly low energies.

Figure 2:
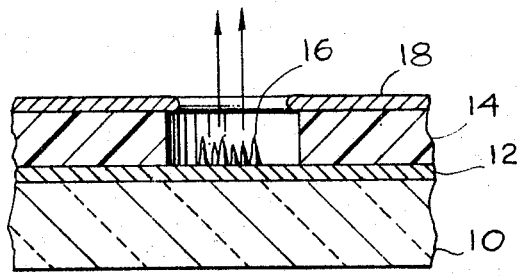

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is an enlarged isometric view of a portion of an electron emitter in accordance with this invention; and FIGURE 2 is a cross-sectional view taken along the lines 2—2 of FIGURE 1 showing the structure of a field emitting site, in accordance with this invention.

Referring now to FIGURE 1, the structure of a cathode in accordance with this invention comprises an insulating substrate 10 which may be made of a ceramic material, upon which a metal film 12 is deposited. The film 12 is made of a material which has desired characteristics for emitting electrons in response to a voltage. A film made of a refractory metal such as molybdenum or tungsten is suitable. A support structure for the accelerator can be a dielectric film 14, such as aluminum oxide, which is deposited over the emitter surface 12 in the form of a cellular grid having a desired mesh size. The mesh is produced by the use of a suitable mask over the film 12 at the time of the insulating film in accordance with well known techniques. Alternatively, the dielectric can be deposited as a continuous film and subsequently micromachined to yield the desired mesh structure. Techniques for doing this are also quite well known.

The needles 16, at the emission sites, are then formed on the exposed areas of the emitter surface by promoting metal migration under proper surface tension whereby small sharp surfaced protuberances 16 are formed.

The accelerator film 18 can then be formed by depositing a metal layer onto the dielectric film, at almost grazing incidence while rotating the substrate around an axis normal to its surface. For producing the desired field emission, a potential source 20 has its positive terminal connected to the accelerator 18 and its negative terminal connected to the emitter film 12. The potential source may be made variable for the purpose of controlling the electron emission current.

FIGURE 2 is a cross-sectional view of an emitter site along the lines 2—2. They illustrate a plurality of protuberances or needles on the field emitting site. Electrons are emitted therefrom under the influence of the field established by the potential applied between the accelerator film and the emitter film.

The substrate can be given any desired shape such as a parabola, or a curve whereby the electrons which are emitted from the field sites will be converged at the focus of the curve. By way of illustration, but not to be considered as a limitation on the invention, a typical method of manufacturing a cathode in accordance with this invention would comprise the step of depositing on a ceramic substrate a refractory or emitting metal film of molybdenum or tungsten. Thereafter, a dielectric film is deposited over the emitting film. The dielectric film has a thickness on the order of a few microns and may be made of a material such as aluminum oxide.

If desired, at this point electron beam technology may be employed to micromachine holes through the dielectric film at a plurality of desired locations to uncover the emitter film surface. Alternatively, the accelerator film, which may also be made of molybdenum or tungsten, may be deposited over the dielectric film and then electron beam techniques may be employed to micromachine holes therethrough until the emitting surface film is reached.

At this point, a film of a relatively low melting point material, such as aluminum, is deposited over the entire surface of the cathode, namely, over the accelerator surface as well as over those portions of the emitting surface as are exposed through the holes. Then, under vacuum conditions, the entire substrate is heated to about 1150° C. This temperature is above the vaporization temperature of the aluminum but not of the molybdenum or tungsten, which ever metal is used for the emitter surface and accelerator surface. Neither is this temperature above the melting point temperature of the substrate or insulating layer materials. The phenomenon which occurs at this temperature, and precisely why is not really understood, is that either some kind of surface migration or surface tension forces cause protuberances of the metal of the emitter surface to be formed at the location of the holes, which protuberances resemble the protuberance 16 represented by the drawing. In order to give some indication of the sizes or dimensions of the various films and holes, the initial emitter film of molybdenum or tungsten may be deposited to a thickness of from one-quarter to one micron on a substrate which may be a ceramic material or may be sapphire. The insulating film of aluminum oxide may also be anywhere from one-quarter to one micron. The accelerating film may be on the order of 30 to 500 angstroms. The aluminum film may be on the order of 30 to 300 angstroms. The holes exposing the emitter sites may be on the order of one-tenth to several microns.

There has accordingly been described and shown herein a novel, useful and improved source of electrons.

What is claimed is:

1. An electron source comprising a first metal film having spaced thereover a plurality of field emitting protuberance sites, and an accelerator electrode comprising a second metal film insulatingly spaced from and substantially parallel to said first metal film a distance on the order of several microns, said accelerator electrode having an opening over each of said field emitting sites.

2. An electron source as recited in claim 1 wherein said accelerator electrode includes a dielectric film between said first and second metal films for insulatingly spacing said first metal film from said second metal film, said dielectric film having openings therethrough which are coextensive with the openings in said second metal film.

3. An electron source as recited in claim 2 wherein said first metal film is deposited on an insulating substrate.

4. An insulating film as recited in claim 1 wherein said first and second metal films are one of the group consisting of tungsten and molybdenum, and said dielectric film is aluminum oxide.

References Cited

UNITED STATES PATENTS

| 1,017,648 | 2/1912 | Chapman et al. | 313—309 X |
| 1,859,875 | 5/1932 | Kern | 313—351 X |
| 2,290,655 | 7/1942 | Thomay | 313—351 X |
| 2,697,800 | 12/1954 | Roberts | 313—309 X |
| 2,983,847 | 5/1961 | Spengler | 313—351 X |
| 3,163,753 | 12/1964 | Disabato et al. | 313—309 X |
| 3,309,523 | 3/1967 | Dyke et al. | 313—309 X |

FOREIGN PATENTS

| 29,854 | 8/1964 | Germany. |

JOHN W. HUCKERT, *Primary Examiner.*

A. J. JAMES, *Assistant Examiner.*

U.S. Cl. X.R.

313—217, 336, 351